Feb. 3, 1970    H. B. JONASSEN ET AL    3,493,518
METHOD OF PREPARING NEW CRYSTALLINE METAL
ALUMINOSILICATE ZEOLITES
Filed April 18, 1966

H. B. JONASSEN, G. P. HAMNER,
J. A. RIGNEY, R. B. MASON, and
S. M. LAURENT    INVENTORS BY  *George M. Gould*

PATENT ATTORNEY

United States Patent Office 3,493,518
Patented Feb. 3, 1970

3,493,518
METHOD OF PREPARING NEW CRYSTALLINE METAL ALUMINOSILICATE ZEOLITES
Hans B. Jonassen, New Orleans, Glen Porter Hamner and James Arthur Rigney, Baton Rouge, Ralph Burgess Mason, Denham Springs, and Sebastian Marc Laurent, Greenwell Springs, La., assignors to Esso Research and Engineering Company, a corporation of Delaware
Filed Apr. 18, 1966, Ser. No. 543,424
Int. Cl. B01j *11/82;* C01b *33/28*
U.S. Cl. 252—438     2 Claims

ABSTRACT OF THE DISCLOSURE

Crystalline alumino silicate zeolites which exhibit a unique X-ray diffraction pattern are prepared by first exchanging an alkali metal containing zeolite with a divalent metal which is less electro positive than the alkali metal and then contacting the divalent metal containing zeolite with a compound capable of forming an imido linkage between the divalent metal cations. The crystalline alumino silicate zeolite of this invention are useful in hydrocarbon conversion processes.

---

Figure 1:
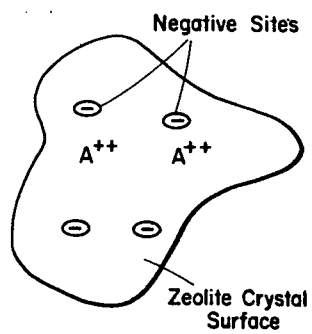

The present invention concerns new crystalline metal aluminosilicate zeolites and methods for preparing them. In particular, the present invention pertains to novel crystalline metal aluminosilicate zeolites wherein the metal cations of the zeolite are particular divalent ions and at least a portion thereof are joined in pairs by means of a nitrogen bridge, i.e. an imido

linkage. This nitrogen bridge or imido linkage forms a superstructure with the zeolite crystal structure and is readily evidenced in the X-ray diffraction patterns exhibited by such materials.

The development of crystalline aluminosilicate zeolites of molecular sieve type has been tremendous in the recent past and such rapid development shows every sign of continuing into the future. The molecular sieves have exhibited outstanding catalytic activity in a wide variety of organic reactions, including most especially those involving conversions of petroleum hydrocarbons. Furthermore, molecular sieves have also been found to be extremely useful in separation processes wherein the singular ability of particular molecular sieves to adsorb one chemical compound species to the virtually complete exclusion of other chemical compounds which might be present.

In order to enhance a particular property of the molecular sieve as either a catalyst or adsorbent, it has been suggested by the art to replace the metal cations in the exchangeable positions in the zeolite crystal lattice. Such changes can affect the pore diameters in the zeolite thereby changing the zeolite's ability to adsorb different size molecules. Also, these introduced metals will change the electrostatic forces in the zeolite structure thus influencing the reactivity and relative acidity of the zeolite.

Other methods of influencing zeolite properties include deposition of metal compounds on the zeolite surface such as by impregnation; activation or deactivation of the zeolite surface with chemical agents such as steam, chlorine, hydrogen sulfide or similar compounds; and additionally deformation of the zeolite structure by thermal or acid treatment.

It has now been found that crystalline aluminosilicates which have been base exchanged with particular divalent metal cations can be converted into new compositions of matter that exhibit distinctive X-ray diffraction patterns by contacting such exchanged zeolites with nitrogeneous compounds capable of forming an imido linkage (—NR—) between two metal atoms. The distinctive feature of the X-ray diffraction patterns obtained from the new compounds of the present invention involve extra lines not present in the diffraction pattern of the untreated crystalline exchanged zeolite.

These extra lines are considered to be due to the presence of superstructure on the zeolite crystal and are believed to be correlatable with the imido bridge linking two adjacent divalent cations in the crystal. The electrostatic neutrality of the crystal lattice is preserved by introducing additional cations such as hydrogen or monovalent metal ions into the negative sites which develop when one bond of each of the two divalent cations is utilized in forming the imido bridge.

Superstructure is a phenomenon manifested in the X-ray diffraction pattern which is believed to be caused by a recurring distance in a plane of symmetry which distance is greater than the crystal unit cell dimension. For example, L. Broussard and D. P. Shoemaker, Journal of the American Chemical Society, 82, 1041 (1960), have observed in the diffraction traces of sodium Zeolite A and calcium Zeolite A, lines at a d-spacing of 4.08 A., which are considered to correspond to the superstructure produced from a continuous alternation of Si and Al ions. Such an alternation actually causes the recurring distances through some planes, and from a Si in the unit cell to the next recurring position in which there is another Si atom in the plane, to be twice the cubic unit cell dimension. Because of the two ions, $Si^{+4}$ and $Al^{+3}$ being isoelectronic, their juxtaposition in the zeolite framework does not influence the X-ray diffraction patterns to any significant extent. However, when the superstructure comprises an imido bridge, the equality of the scattering powers of the Si and Al ions are upset to unequal extents thereby resulting in the production of distinct, new diffraction lines in the X-ray patterns observed for these materials.

The imido-superstructured crystalline zeolites of the present invention can be conveniently prepared by cation exchanging a crystalline metal aluminosilicate zeolite having uniform pore openings in the range between about 3 to about 15 angstroms with an aqueous solution of a divalent metal cation using exchange techniques well known in the art. One necessary limitation on the identity of the divalent metal cation is based on the necessity that the metal be capable of forming covalent bonds with nitrogen. Generally, suitable divalent metals are derived from those metals which are less electropositive than the alkali metals. The alkali metals do not bond covalently but rather are limited to ionic bonding. Thus, crystalline aluminosilicates containing alkali metals will be inoperative for the formation of the new compositions of the present invention. Divalent metal cations which will be suitable for use in forming imido superstructured crystalline zeolites include zinc, manganese, cadmium, cobalt, nickel, etc. It is generally desired to replace at least about 80% of the original cation content of the zeolite with the operative divalent metal cation.

The imido superstructure is formed by contacting a crystalline aluminosilicate zeolite, which has been base exchanged with a suitable divalent metal cation as discussed above, with monosubstituted alkyl or aryl amines (which may be characterized as $R-NH_2$), ammonia or aqueous solutions of such compounds, e.g., ammonium hydroxide. The amines or ammonia may be introduced either as liquids, gases, or as solutions in selected solvents to effectuate the desired reaction forming the imido bridge. This operation leaves the electronegative sites on the zeolite previously bonded to the divalent cation occupied with either ammonium or alkyl or aryl ammonium ions. Careful heating, e.g. a temperature in the range between about 200 to 700° F., is sufficient to decompose the ammonium ions leaving hydrogen ions or substituted amines in these positions. Under selected conditions and with zeolites capable of admitting substituted amines, certain alkyl or aryl groupings may be incorporated in the zeolite crystal structure by this technique.

The crystalline aluminosilicate zeolites which may be utilized in the practice of the present invention include both natural and synthetic zeolites. Included within the natural crystalline aluminosilicate zeolites are levynite, erionite, faujasite, analcite, paulingite, noselite, ferrierite, heulandite, scolecite, stilbite, clinoptilolite, harmotome, phillipsite, brewsterite, flakite, datolite, chabazite, gmelinite, cancrinite, leucite, lazurite, sepiolite, ptilolite, mesolite, mordenite, nepheline, natrolite and sodalite.

Some representative synthetic crystalline aluminosilicate zeolites include Zeolite A, Zeolite X, Zeolite Y, Zeolite L, Zeolite O, Zeolite R, Zeolite S, Zeolite T, Zeolite Z, Zeolite F, Zeolite Q and Zeolite B. For more complete formula representations for each of these synthetic crystalline zeolites see U.S. Patent No. 3,140,251, patented July 7, 1964, by Charles J. Plank et al.

The formation of the imido superstructure may be more clearly understood by reference to the drawing. It should be understood that the drawing and the following relevant discussion are advanced for the purpose of illustration only and should not be taken as limiting the scope of this invention in any manner. Furthermore, such explanation is based on presently available experimental data and therefore would be subject to change based on additional findings without concomitant prejudice to the status of the invention disclosed herein.

Turning now to the drawing, the following descriptions of the included figures are given:

FIGURE 1 represents a diagrammatical view of a zeolite crystal surface after cation exchange with a divalent metal cation $A^{++}$. Four electronegative sites are shown on the crystal, these sites being electrostatically neutralized by ionic bonding with the two divalent cations.

Figure 2:
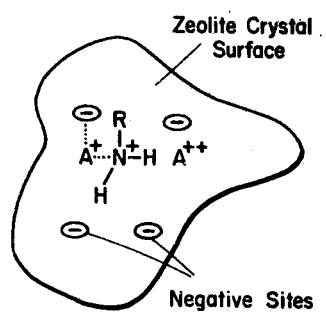

FIGURE 2 describes an intermediate stage in the formation of the imido bridge. Ammonia or a monosubstituted amine (represented by $R-NH_2$, where R may be H, alkyl or aryl), having an unshared pair of electrons, reacts as a Lewis base and would therefore be quite nucleophilic. Thus, such compounds would react with centers of relatively low electron density such as the metal cation. In FIGURE 2, the unshared electrons of the nitrogenous compound are seen to have formed a covalent bond with the metal. The loss of these electrons through bonding induces a lower electron density around the nitrogen which is represented by the plus sign on the nitrogen. The electrons forming the N—H bonds will become oriented closer to the nitrogen thus weakening these bonds. A proton is then lost thereby restoring electrostatic neutrality to the system.

Figure 3:
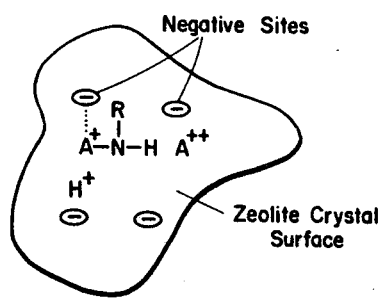

With the loss of the proton, the nitrogen regains its unshared pair of electrons which are again available for nucleophilic interactions. In FIGURE 3, illustration is made of this point in the reaction scheme. The proton released from the nitrogenous compound has been depicted as migrating to the electronegative site on the crystal to stabilize this charge. However, it is evident that this proton might be abstracted from the nitrogenous compound by a basic compound such as ammonia while the electronegative site on the crystal may be stabilized by some environmental cationic species.

Figure 4:
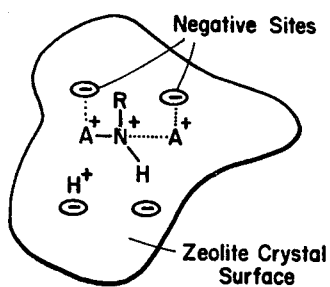

FIGURE 4 represents a still further possible intermediate stage in the formation of the imido bridge. At this point, the unshared pair of electrons of the nitrogen have interacted with the adjacent divalent metal cation. This interaction disrupts the remaining N—H bond as before and results in the loss of the hydrogen as a proton.

Figure 5:
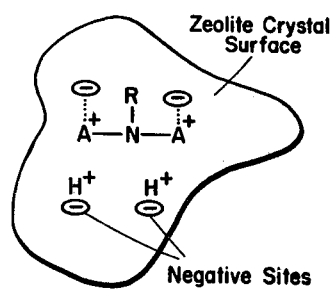

Finally, FIGURE 5 describes the resulting imido bridge after completion of the reaction sequence. Again, the proton lost by the nitrogenous compound has been shown as the stabilizing species for the electronegative site, but as before this is representative of only one of the several possible methods by which such stabilization may occur. Whether in fact such stabilization arises from an intramolecular or intermolecular mechanism is not believed to be vital to the formation of the imido bridge.

While the various compounds used in the preparation of the novel compositions of the present invention have been broadly described, certain preferred embodiments exist. For example, among the crystalline aluminosilicate zeolites, Zeolite A, faujasite, erionite and chabazite are compounds of preference. A particularly preferred zeolite is Zeolite A.

Similarly, it is desirable that the nitrogenous compound be either ammonia (as a gas or as ammonium hydroxide in solution) or a monosubstituted lower alkyl amine. Ammonium hydroxide represents a particularly preferred nitrogenous compound.

Finally, among the divalent metals which are less electropositive than the alkali metals, zinc and cadmium represent preferred species. In particular zinc is a most preferred cation.

The imido bridge containing crystalline aluminosilicate zeolites of the present invention are observed to have highly desirable catalytic properties, especially in hydrocarbon conversion reactions. They are particularly useful in the conversion of petroleum hydrocarbons in reactions including cracking, hydrocracking, selective hydrocracking, hydrogenation, dehydrogenation, hydrotreating alkylation, aromatic dealkylation, polymerization, aromatic disproportionation, isomerization and hydroisomerization. Other catalytic reactions in which the compositions of the present invention are useful include alcohol synthesis by olefin hydration, hydrocarbon synthesis, ammonia synthesis and various reactions, involving additions to and rearrangements of hydrocarbon molecules.

The compositions of the present invention find still further use as adsorbents such as for gas separations, e.g, preparation or upgrading of oxygen, nitrogen, carbon dioxide, helium, natural gas, methane, etc.; and for liquid separations, e.g. removal of n-paraffins from mixtures containing iso- and cycloparaffins. Other adsorptive uses for the imido-bridged crystalline aluminosilicate zeolites include the drying of organic liquids, the selective removal of unsaturated or aromatic compounds from mixtures with other types of compounds by selective complexing with metals contained in the zeolite and many other similar types of adsorptive processes.

It should be understood that the operability or applicability of any particular composition of the present invention in any of the above enumerated catalytic or adsorptive processes will depend upon the identity of the crystalline zeolite, the divalent metal cation and the nitrogenous compound as well as whether the composition is composited with other active agents such as the noble metals for hydrogenation reactions and the rare earth metals for cracking reactions.

The nature of the present invention will be more clearly understood by reference to the following examples:

EXAMPLE 1

This example discloses a method for preparing a representative imido-bridged crystalline metal aluminosilicate zeolite. The zeolite of choice in this method is Zeolite A which has been cation exchanged with zinc. Ammonium hydroxide represents the nitrogenous compound in this preparation.

Zinc Zeolite A was prepared by a three-fold exchange of sodium Zeolite A with 15% zinc chloride solutions and a five-fold water washing. A portion of the wet cake, amounting to about 400 grams of the exchanged zeolite on a dry basis, was suspended in 1000 grams of water and 500 grams of ammonium hydroxide was added with stirring at room temperature and agitation was continued for a total of about 20 hours. The treating solution was removed and after the incorporation of a small amount of palladium the resultant solid was dried at 250 to 300° F. The product analyzed 18.8% zinc and contained about 0.5 wt. percent palladium.

EXAMPLE 2

This example demonstrates the fact that an imido bridge has been formed on the Zeolite A by the method of Example 1. The resulting composition of Example 1 was tested by X-ray diffraction using copper Kα doublet as the radiation source. The trace obtained was compared to that exhibited by untreated sodium Zeolite A, zinc Zeolite A prepared by the ion exchange method disclosed in Example 1 and finally the ammonium hydroxide treated zinc Zeolite A of Example 1. The diffraction data are tabulated below:

X-RAY DATA FOR MAJOR DIFFRACTION LINES

| Normal Zeolite "A" | | | Superstructured Zeolite "A" | | |
|---|---|---|---|---|---|
| Plane Indexes (h, k, l) | Interplanar Spacing (A.) | Intensity (percent) | Plane Indexes (h, k, l) | Interplanar Spacing (A.) | Intensity (percent) |
| | | | *111 | 14.25 | 21 |
| 100 | 12.35 | 71 | 100 | 12.35 | 89 |
| 110 | 8.75 | 59 | 110 | 8.75 | 16 |
| | | | *311 | 7.47 | 16 |
| 111 | 7.13 | 38 | 111 | 7.13 | 39 |
| | | | *222 | 6.17 | 12 |
| | | | *331 | 5.70 | 13 |
| 210 | 5.51 | 33 | 210 | 5.51 | 29 |
| 211 | 5.03 | 3 | 211 | 5.03 | 7 |
| | | | *333 | 4.73 | 5 |
| 300, 221 | 4.08 | 63 | 300, 221 | 4.08 | 97 |
| 310 | 3.87 | 4 | 310 | 3.87 | 12 |
| 311 | 3.69 | 94 | 311 | 3.69 | 89 |
| 222 | 3.53 | 3 | 222 | 3.53 | 11 |
| 320 | 3.40 | 26 | 320 | 3.40 | 14 |
| 321 | 3.27 | 86 | 321 | 3.27 | 100 |
| | | | *553 | 3.19 | 14 |
| 400 | 3.06 | 2 | 400 | 3.06 | 10 |
| 410, 322 | 2.96 | 100 | 410, 322 | 2.96 | 68 |
| 411, 330 | 2.88 | 19 | 411, 330 | 2.88 | 9 |
| 420 | 2.73 | 21 | 420 | 2.73 | 28 |
| 421 | 2.67 | 6 | 421 | 2.67 | 17 |
| 332 | 2.61 | 65 | 332 | 2.61 | 51 |
| 422 | 2.49 | 8 | 422 | 2.49 | 34 |
| 430, 500 | 2.45 | 7 | 430, 500 | 2.45 | 11 |
| 431, 510 | 2.40 | 2 | 431, 510 | 2.40 | 4 |
| 333, 511 | 2.35 | 7 | 333, 511 | 2.35 | 5 |
| 432, 520 | 2.27 | 4 | 432, 520 | 2.27 | 6 |
| 521 | 2.23 | 5 | 521 | 2.23 | 5 |

*These planes do not fit the structure of normal Zeolite "A."

The data in the table show that there are six significant X-ray diffraction planes (*) in the region presented that are not found in the normal A zeolite structure. Careful examination and measurement reveals that these planes belong to a structure having twice the unit cell dimension of the normal zeolite, i.e., that normal zeolite in this example has a unit cell size, $a$, of 12.35 A. and the average unit cell size calculated from the six superstructure lines is 24.68 A., twice the normal dimension within experimental error. It will also be noted from the table that relative intensities for various diffraction lines differ between the normal zeolite and the superstructured zeolite. This is not uncommon with the zeolite family as a class, since varying amounts of adsorbed water, cation type and population, and other factors are known to generate such variations.

EXAMPLE 3

This example shows the stability of the imido-bridged zinc Zeolite A of the present invention. The ammonium hydroxide treated zinc Zeolite A of Example 1 was heated in an inert atmosphere, e.g. helium, to a temperature of about 700° F. without any sign of substantial changes in the diffraction peaks attributed to the imido bridge. Some signs of decomposition of this structure were evidenced in a sample heated to about 900° F.

Upon heating the imido bridge structured Zeolite A the evidence of superstructure is enhanced indicating that more crystalline perfection having to do with the superlattice planes is taking place. This is a phenomenon well known in crystal growth technology. At temperatures above 700° F. or at about 900° F. the imido bridge structure becomes unstable and the cross-linking breaks down so that the cation sites return to normal and are now occupied by metal ions. When this occurs the X-ray diffraction lines having spacings of 14.25, 7.47, 6.17, 5.70, 4.73 and 3.19 angstroms shown in the table of Example 2 disappear from the pattern and only the normal Zeolite A structure of 12.35 A. unit cell size remains.

When the temperature of the sample is lowered to 700° F. or lower and ammonia gas is readmitted, the superstructure is again formed and these diffraction lines reappear.

What is claimed is:
1. A method of preparing a crystalline aluminosilicate zeolite characterized by the presence of an imido bridge which comprises (1) cation exchanging a crystalline metal aluminosilicate zeolite having uniform pore openings in the range between about 3 to about 15 angstroms with an aqueous solution of a divalent metal cation which is less electropositive than the alkali metal; (2) then contacting the divalent metal containing zeolite with ammonia to form the imido bridge; (3) heating said zeolite to a temperature between 200 and 700° F.; and (4) recovering a crystalline alminosilicate zeolite having at least a portion of the divalent metal cations linked to an imido bridge.

2. The process of claim 1 wherein said crystalline alumino silicate zeolite is Zeolite A.

References Cited

UNITED STATES PATENTS 3,239,471  3/1966  Chin et al. _____ 252—455
3,293,192  12/1966  Maher et al. _____ 252—438 X
3,331,768  7/1967  Mason et al. _____ 252—455 X DANIEL E. WYMAN, Primary Examiner C. F. DEES, Assistant Examiner U.S. Cl. X.R.
23—113; 252—455